Sept. 17, 1935.  C. S. WOODRUFF  2,014,459
AUXILIARY VEHICLE WHEEL
Filed Sept. 15, 1934  2 Sheets-Sheet 1

INVENTOR
Charles S. Woodruff
BY Maréchal + Noz
ATTORNEY

Sept. 17, 1935.  C. S. WOODRUFF  2,014,459
AUXILIARY VEHICLE WHEEL
Filed Sept. 15, 1934   2 Sheets-Sheet 2

Inventor
Charles S. Woodruff
By Maréchal & Noe
Attorney

Patented Sept. 17, 1935

2,014,459

UNITED STATES PATENT OFFICE 2,014,459

AUXILIARY VEHICLE WHEEL

Charles S. Woodruff, Van Wert, Ohio

Application September 15, 1934, Serial No. 744,177

12 Claims. (Cl. 301—38)

This invention relates to vehicles such as motor cars and the like, and more particularly to auxiliary devices therefor adapted for cooperation with the vehicle wheel and operable in case of a blowout or when the pneumatic tire of the vehicle wheel is unduly flattened.

One object of the invention is the provision of an auxiliary device of the character mentioned adapted for use with a vehicle wheel having a pneumatic tire, in which an auxiliary wheel is automatically lowered in case of a blowout or in case of unusually low pressure in the tire, so as to assume the weight normally taken by the tire, and so arranged as to prevent destructive flattening of the tire.

Another object is the provision of an auxiliary wheel, and a support therefor in which the auxiliary wheel is rotatably mounted and in which it is bodily movable from a normal raised position to a lower position where it is in contact with the ground at a point of substantially normal spacing from the center of the pneumatic tire with which it is associated.

Another object of the invention is the provision of an auxiliary device including an auxiliary wheel adapted to automatically come into effect in case of a blowout or in case of unusually low air pressure in the tire with which it is associated so as to immediately raise the load and prevent destructive flattening of the tire.

Other objects and advantages of the invention will be apparent from the following description, the appended claims and the accompanying drawings, in which,—

Figure 2:
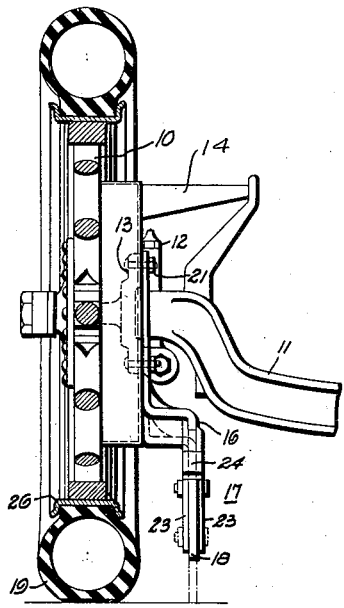
Fig. 2 is a front elevation of the same showing the wheel and tire in section.

Referring more particularly to the drawings by reference numerals, 10 designates the right front wheel of an automobile or motor vehicle. The automobile may be of any usual construction, and as herein shown includes a front axle 11 connected by a king pin 12 to a non-rotatable frame portion 13 on which the wheel 10 is rotatably mounted. The numeral 14 represents a portion of the steering mechanism which is also connected to the frame portion 13 of the wheel.

Figure 1:
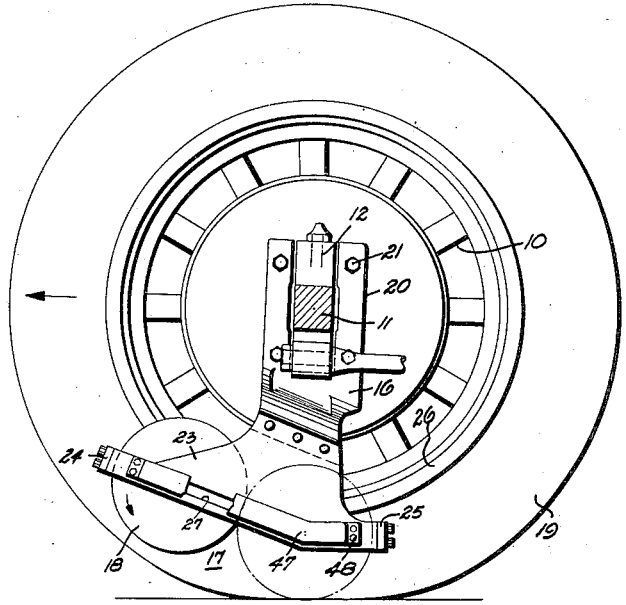
Fig. 1 is a side elevation of a vehicle wheel and the auxiliary device embodying the present invention, the front axle being shown in section.

Fixed to the frame portion 13 is a support member 16 forming part of an auxiliary supporting device designated generally by the numeral 17 and including a small wheel 18 which is adapted to become effective in case of a blowout or undue flattening of the pneumatic tire 19 with which the wheel 10 is provided. The support member 16, as shown in Figs. 1 and 2, comprises a bifurcated plate 20, the two upper arms of which straddle the king pin position, being secured by bolts 21 to the frame portion 13. The lower portion of the plate 20 is bent inwardly as shown in Fig. 2 and is bolted or riveted to a pair of opposed side plates 23 which are spaced apart as by means of end plates 24 and 25, leaving a space between the plates for the auxiliary wheel 18.

In its normal position, the wheel 18 is raised a considerable distance above the ground level as shown in solid lines in Fig. 1, and in this position the bottom of wheel 18 is spaced above the ground a distance less than the tire width, preferably about half way between the level of the ground and the level of the rim 26 on which the tire 19 is mounted. In this position it is raised high enough so as to be quite clear of the usual road obstructions and permits the unrestricted cushioning effect of the tire 19 in the normal operation of the vehicle.

The support member 16 is provided with a pair of parallel guides or runways 27 which are inclined downwardly and rearwardly and which terminate approximately in vertical alignment with the axis of rotation of the tire 19. The axle of the auxiliary wheel 18 operates along these runways when a blowout of the tire 19 occurs, since, in such event, the tire 19 will be momentarily flattened or almost flattened bringing the auxiliary wheel 18 into contact with the ground. Rotation of the wheel 18 in a counterclockwise direction when it contacts with the ground causes the wheel to be moved down to its lower position, the axle operating along the runways due to the rotation of the wheel 18. In its lower position, as shown in dotted lines in Fig. 1, the bottom of the wheel 18 is located at the same distance from the center axis of the tire 19 or wheel 10 as the normal distance between the ground and the tire axis, so that the tire is held in its normal ground contacting relationship, the tire being relieved from the load so the latter does not operate in a flattened condition. Ordinarily when a blowout occurs or when a tire becomes unduly flattened by reason of loss of air pressure the car is driven quite a long distance by car inertia or because the driver does not stop promptly, damaging the fabric of the casing and damaging the tube, often beyond repair. In accordance with the present invention, however, as soon as a blowout occurs, the auxiliary wheel immediately comes into effect in an automatic manner and raises that portion of the car supported by the wheel back substantially to its normal position, the auxiliary wheel assuming the entire weight ordinarily taken by the tire. And since the tire is brought back to its normal attitude with respect to the ground, there will still be sufficient tractive effect between the tire itself and the ground, even though the tire has been blown out, to provide effective steering control where the auxiliary device is used on a front wheel, or to provide effective tractive effect between the tire and the ground where the auxiliary device is used in conjunction with one of the driven wheels. It is contemplated that an auxiliary supporting wheel will be used in conjunction with each wheel of a motor vehicle.

Figure 4:
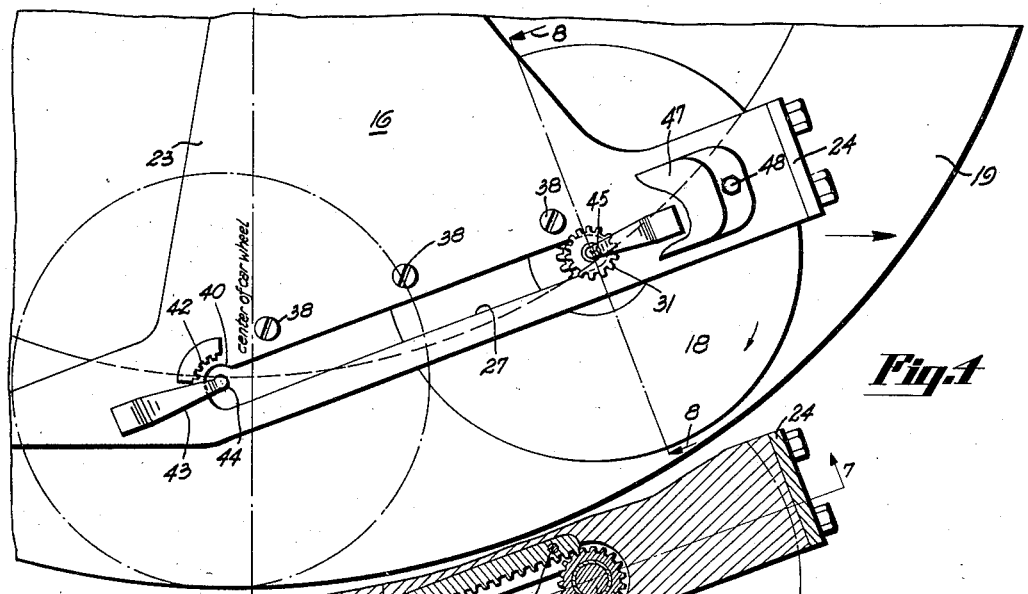
Fig. 4 is an enlarged view of the auxiliary device shown in elevation, with the cover plate 47 broken away.
Figure 6:
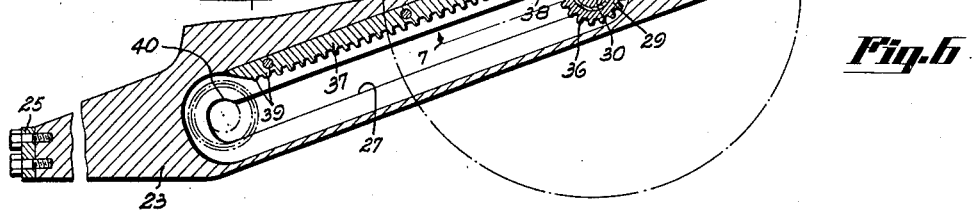
Fig. 6 is a vertical section on the line 6—6 of Fig. 5.

If the axle of the auxiliary wheel 18 is rigid with the auxiliary wheel it will be apparent that unless the angle of inclination of the guide or runway 27 is too close to the perpendicular, the rotation of the axle caused by rotation of the auxiliary wheel when contacting the ground will cause the axle to be moved down the runway even if the runway is smooth, since the pressure is applied between the axle and the upper side of the runway. However, in order to positively cause a downward movement of the auxiliary wheel in case of a blowout or in case the tire pressure falls beyond a safe operating value, co-operating rack and gear means are provided on the support member 16 and on the wheel 18 so that as the wheel is rotated by contact with the ground it is caused to move downwardly in a positive manner until it reaches its lower position. As shown in Figs. 4 to 8 in which a preferred form of the invention is illustrated, the wheel 18 is fixed to a bearing member or sleeve 29 which is journaled for rotation on a shaft 30. The diameter of the shaft 30 at its end portions which cooperate with the guide or runway 27 is very slightly less than the distance between the upper and lower guide surfaces. Fixed to one end of the shaft 30 is a locking gear 31 and at the other end of the shaft is a nut 32 bearing against a shoulder 33 so that endwise movement of the shaft 30 with respect to the support member 16 is prevented. A washer 34 is provided between the plate 23 and the nut 32. On opposite sides of the wheel 18, the bearing member 29 is provided with gear teeth 36 which mesh with racks 37 fixed as by means of screws 38 to the side plates 23 of the support member. As shown in Fig. 6, the racks 37 extend up far enough so as to be engaged with the gears 36 of the auxiliary wheel when the latter is in its raised or normal position indicated in solid lines in Fig. 4. Thus as soon as the wheel 18 is rotated in a clockwise manner, as shown in Fig. 4, by reason of its contact with the ground, the gear 36 will be moved along the rack 37, causing positive downward and rearward movement of the auxiliary wheel until the latter reaches its lowered position.

The end teeth 39 at the lower ends of the two racks 37 are cut away at their ends, and the guide or runway 27 at its end portion is deflected upwardly as indicated at 40 so that when the wheel 18 is lowered and its gear teeth 36 run off of the end of the racks 37, the shaft 30 bears against the deflected portion 40 of the guide or runway. In its lowered position, the continued rotation of the wheel 18 is permitted freely since the gear and rack are at that time disengaged. When the wheel 18 is lowered the lock gear 31 fixed on the end of the shaft 30 engages with a toothed lock segment 42 fixed on the outer side of plate 23, holding the shaft 30 against rotation. The shaft 30 is also positioned axially, when brought into engagement with the deflected portion 40 of the guide, by means of a spring 43 the rounded end 44 of which snaps into a small depression centrally arranged in the end of the lock gear 31. This prevents the auxiliary wheel from moving bodily with respect to the support member after it has reached its lowered position. A second spring 45 is provided for engagement in a yielding manner with the end depression in lock gear 31 to yieldingly maintain the auxiliary wheel in its normal raised position, although as soon as the auxiliary wheel is positively rotated by contact with the ground the yielding effect of spring 45 is immediately overcome.

Figure 5:
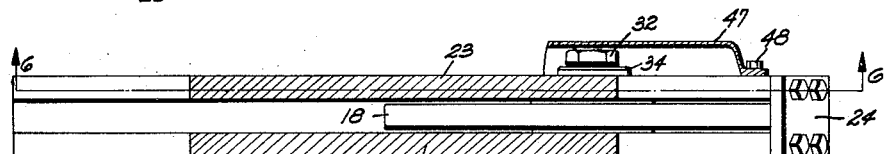
Fig. 5 is a top plan view of the auxiliary device, side plates 23 being shown in section.
Figure 8:
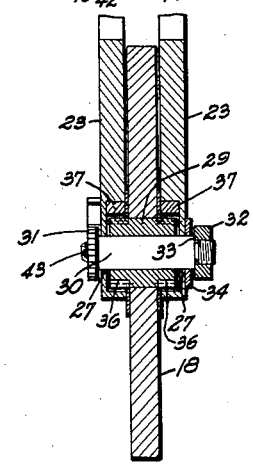
Fig. 8 is a vertical section on the line 8—8 of Fig. 4.
Figure 7:
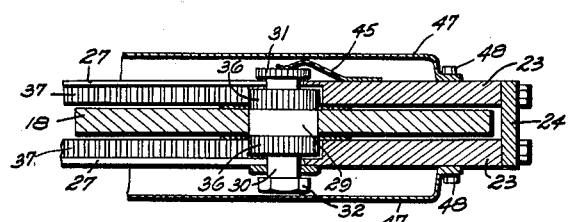
Fig. 7 is a horizontal section on the line 7—7 of Fig. 6.

As shown in Figs. 5 and 7, the inclined guideways 27 and the ends of the wheel shaft may be enclosed and protected by removable light cover plates 47 which are connected by bolts 48 at opposite ends of the cover plates to the side plates 23 of the support member.

The auxiliary support of the present invention may be used in conjunction with the front or steerable wheels of an automobile in the manner illustrated for example in Figs. 1 and 2 of the drawings. When so used, the auxiliary wheel 18 is adapted to be turned with the steering movement of the wheels, as the support member 16 is fixed to the frame member 13 of the wheel. Thus the auxiliary wheel always rotates in a plane parallel to the plane of rotation of the tire with which it is associated, and even if a blowout should occur while the automobile is negotiating a curve it will be apparent that the wheel 18 is aligned with the direction of its relative motion with respect to the ground and will rotate freely without undue strain on the parts as soon as a blowout occurs to raise the lowered corner of the automobile back immediately to its normal attitude and relieve the weight entirely from the blow out tire. This will effectively prevent damage to the tire, since the latter does not continue to operate in a flattened condition. Moreover the operation of the auxiliary device in case of a blowout, especially at high speed operation, provides effective steering control, since the tractive or steering effect of the two front tires is instantly substantially equalized.

Figure 3:
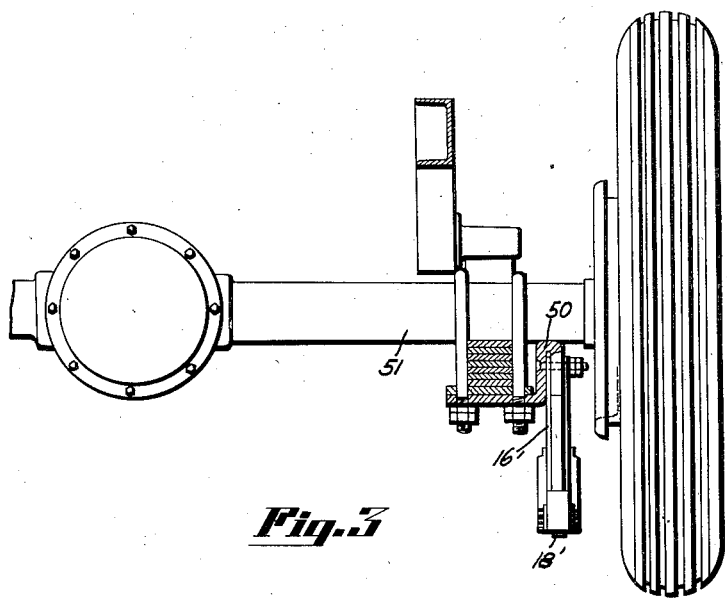
Fig. 3 is a rear elevation showing the adaptation of the auxiliary device to a rear wheel of a motor car, the vehicle spring and angle plate 50 being shown in section.

When the auxiliary supporting device is used in conjunction with one of the rear or driven wheels of the vehicle, it is preferably located a little distance inside of the rear tire as shown in Fig. 3. The support member 16' on which the auxiliary wheel 18' is mounted is preferably secured directly to a fixed part of the automobile chassis, being shown as fixed at its upper end to an angle plate 50 which is secured to the rear axle housing 51. When used in conjunction with a rear or driven wheel, damage is prevented to the tire in case of blowout or if there should be such a loss of pressure as to cause undue flattening of the tire to an extent that the auxiliary wheel in its normal raised position will be brought into contact with the ground. Since the auxiliary wheel, when in its lower position in the support member, is in contact with the ground at a distance from the tire center substantially corresponding to the normal operating distance between the tire center and the ground, the tread of the blowout or deflated tire has sufficient ground contact or traction as to give a tractive or propelling effect, and the vehicle can therefore be driven a long distance without damage to the tire while supported on the auxiliary wheel which, of course, may be made of sufficient width or thickness so as to have an adequate contact area of support on the ground. The auxiliary wheel may also be used as a means for raising the associated wheel and tire from the ground whenever desired merely by running the auxiliary wheel on an inclined board or support of sufficient thickness to raise the tire clear of the ground to facilitate a tire or wheel change.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In combination, a front vehicle wheel having a pneumatic tire, a non-rotatable frame portion rotatably supporting said wheel and movable for steering the vehicle and auxiliary wheel, a support member in which said auxiliary wheel is mounted for rotation and for bodily movement from a normal raised position to a predetermined lower position, said support member being fixed to said non-rotatable frame portion and movable therewith during steering movements of the said frame portion, said auxiliary wheel being normally above the ground level and when in its lower position being in contact with the ground at a point of substantially normal spacing from the pneumatic tire axis.

2. In a vehicle having a supporting wheel provided with a pneumatic tire, an auxiliary support comprising a support member and an auxiliary wheel normally spaced above the ground and mounted in said support member and adapted for rotation by contact with the ground when the pneumatic tire is unduly flattened, said wheel and support member having cooperating means compelling lowering movement of the wheel when the same is rotated by contact with the ground.

3. In a vehicle having a supporting wheel and a pneumatic tire therefor, an auxiliary wheel, a support member for the auxiliary wheel mounted adjacent said supporting wheel, an axle on which the auxiliary wheel is mounted, and an axle guide inclined downwardly in said support member along which the axle is automatically moved to a lowered position when the auxiliary wheel is rotated by contact with the ground.

4. In a vehicle having a supporting wheel and a pneumatic tire therefor, an auxiliary wheel, a support member for the auxiliary wheel mounted adjacent said supporting wheel, an axle on which the auxiliary wheel is mounted, an axle guide inclined downwardly in said support member along which the axle moves from a normal raised position to a lower position in which the tire is maintained substantially in its normal engagement with the ground, rack teeth on said support member, and gear teeth fixed to said auxiliary wheel and meshing with said rack teeth to positively cause downward movement of the auxiliary wheel when rotated by contact with the ground.

5. In a vehicle having a supporting wheel provided with a pneumatic tire, an auxiliary support comprising a support member mounted on the vehicle adjacent the wheel, an auxiliary wheel rotatably mounted on said support member in a normal position spaced from the ground a distance less than the tire depth, said support member having a downwardly and rearwardly inclined guide providing for downward movement of the auxiliary wheel to a lower position in which it contacts with the ground at a predetermined point of substantially normal spacing from the pneumatic tire axis to definitely limit the flexing of the pneumatic tire.

6. In a vehicle having a supporting wheel provided with a pneumatic tire, an auxiliary support comprising a support member mounted on the vehicle adjacent the wheel, an auxiliary wheel rotatably mounted on said support member in a normal position spaced from the ground a distance less than the tire depth, said support member having an inclined guide providing for downward movement of the auxiliary wheel to a lower position in which it contacts with the ground at a point of substantially normal spacing from the pneumatic tire axis, and means for automatically moving the auxiliary wheel in a positive manner to its lower position when it is rotated by contact with the ground.

7. In a vehicle having a supporting wheel provided with a pneumatic tire, an auxiliary support comprising a support member mounted on the vehicle adjacent the wheel, an auxiliary wheel rotatably mounted on said support member in a normal position spaced from the ground a distance less than the tire depth, said support member having a guide providing for downward movement of the auxiliary wheel to a lower position in which it contacts with the ground at a point of substantially normal spacing from the pneumatic tire axis, a rack on said support member parallel to said guide, and a gear fixed to said auxiliary wheel and engaging said rack to move the auxiliary wheel to its lower position when the auxiliary wheel is rotated by contact with the ground when the vehicle is moving forwardly.

8. In a vehicle having a supporting wheel provided with a pneumatic tire, an auxiliary support comprising a support member mounted on the vehicle adjacent the wheel, an auxiliary wheel rotatably mounted on said support member in a normal position spaced from the ground a distance less than the tire depth, said support member having a guide providing for downward movement of the auxiliary wheel to a lower position in which it contacts with the ground at a point of substantially normal spacing from the pneumatic tire axis, a rack on said support member parallel to said guide, said rack terminating a distance from the gear when the auxiliary wheel is in its lower position, and a gear fixed to said auxiliary wheel and engaging said rack to move the auxiliary wheel to its lower position when the auxiliary wheel is rotated by contact with the ground when the vehicle is moving forwardly.

9. In a vehicle having a supporting wheel provided with a pneumatic tire, an auxiliary support comprising a support member mounted on the vehicle adjacent the wheel, an auxiliary wheel rotatably mounted on said support member in a normal position spaced from the ground a distance less than the tire depth, said support member having an inclined guide providing for downward movement of the auxiliary wheel to a lower position in which it contacts with the ground at a point of substantially normal spacing from the pneumatic tire axis, and means on said support member for maintaining the axial location of said auxiliary wheel when its lower position is attained.

10. In a vehicle having a supporting wheel provided with a pneumatic tire, a small auxiliary comprising a support member mounted on the vehicle adjacent the wheel, an auxiliary wheel rotatably mounted on said support member in a normal position spaced from the ground a distance less than the tire depth, said support member having a downwardly and rearwardly inclined guide providing for downward movement of the auxiliary wheel to a lower position in which it contacts with the ground at a point of substantially normal spacing from the pneumatic tire axis, and means for yieldingly holding said auxiliary wheel in its normal raised position.

11. In a vehicle having a supporting wheel provided with pneumatic tire, a small auxiliary wheel, a support member rotatably supporting said auxiliary wheel for rotation in a plane parallel to the plane of rotation of the tire and closely adjacent the tire, means for normally holding said auxiliary wheel in a normal position spaced from the ground, said support member having a guide providing for downward movement of the auxiliary wheel from its normal position to a predetermined fixed lower position in which it contacts the ground at a point of normal spacing from the pneumatic tire axis, to prevent flexing of the pneumatic tire beyond the normal loaded flexure.

12. In a vehicle having a supporting wheel provided with a pneumatic tire, an auxiliary support comprising a small auxiliary wheel, a support member mounted on the vehicle in fixed position with respect to the plane of rotation of said supporting wheel and adjacent thereto, a shaft on which said auxiliary wheel is rotatably mounted, a guide in said support cooperating with said shaft and providing for downward movement of the auxiliary wheel from a normal raised position in which the auxiliary wheel is spaced from the ground a distance less than the tire depth to a lower position in which it contacts the ground at a point of substantially normal spacing from the pneumatic tire axis, a gear fixed to said auxiliary wheel, and a rack fixed on said support and cooperating with said gear to cause positive downward movement of the auxiliary wheel when rotated by contact with the ground.

CHARLES S. WOODRUFF.

CERTIFICATE OF CORRECTION.

Patent No. 2,014,459. September 17, 1935.

CHARLES S. WOODRUFF.

It is hereby certified that error appears in the printed specification of the above numbered patent requiring correction as follows: Page 4, first column, line 12, claim 10, for the words "a small auxiliary" read an auxiliary support; and that the said Letters Patent should be read with this correction therein that the same may conform to the record of the case in the Patent Office.

Signed and sealed this 5th day of November, A. D. 1935.

Leslie Frazer (Seal) Acting Commissioner of Patents.